(12) United States Patent
Granby (10) Patent No.: US 7,751,093 B2
(45) Date of Patent: Jul. 6, 2010

(54) COPYING SYSTEM AND METHOD

(75) Inventor: Peter Granby, Welwyn Garden City (GB)

(73) Assignee: Xerox Corporation, Norwalk, CT (US)

( * ) Notice: Subject to any disclaimer, the term of this patent is extended or adjusted under 35 U.S.C. 154(b) by 911 days.

(21) Appl. No.: 11/593,727

(22) Filed: Nov. 7, 2006

(65) Prior Publication Data

US 2008/0106767 A1   May 8, 2008

(51) Int. Cl.
*H04N 1/32* (2006.01)
*H04N 1/04* (2006.01)

(52) U.S. Cl. ...................... 358/474; 358/442

(58) Field of Classification Search ............... 709/203, 709/201, 202; 358/444, 1.16, 400, 401, 407, 358/405, 1.15, 402, 404, 434, 436, 443, 468, 358/474, 442
See application file for complete search history.

(56) References Cited

U.S. PATENT DOCUMENTS 7,586,635 B2 * 9/2009 Maeda et al. ............... 358/1.15

| 2001/0054152 A1* | 12/2001 | Nakao et al. | 713/182 |
| 2004/0160629 A1* | 8/2004 | Hull et al. | 358/1.15 |
| 2006/0012825 A1* | 1/2006 | Kadowaki | 358/1.15 |
| 2006/0028672 A1* | 2/2006 | Abiko | 358/1.14 |
| 2006/0092455 A1* | 5/2006 | Maeda et al. | 358/1.15 |
| 2007/0121147 A1* | 5/2007 | Corona et al. | 358/1.15 |

OTHER PUBLICATIONS

Canon(UK) Ltd., *Canon Imaging across networks, Callisto total control of print management across entire networks*, 2 pages, Nov. 2006.
Emtex Ltd., *Emtex Case Study: AXA Insurance (UK), Emtex VIP streamline the print management at AXA* (UK), 2 pages, Nov. 2006.
Canon Europa N.V., *Control printing and copying effectively with uniFLOW Output Manager* 8 pages, Mar. 2005.
Gestetner, *DOC-Q-MANAGER Move your high volume document workflow in a profitable direction*, 4 pages, Nov. 2006.
Xerox, *harness the full power of your digital print operation with FreeFlow™ Output Manager* (2005) 2 pages, Dec. 2005.

* cited by examiner

*Primary Examiner*—Jerome Grant, II
(74) *Attorney, Agent, or Firm*—Fay Sharpe LLP (57) ABSTRACT

A copying system is capable of generating image data from an existing representation and communicating the image data to one or more associated marking systems for distributed copy output of sheet media bearing an image corresponding to the existing representation. A method of generating such distributed output is also included.

21 Claims, 6 Drawing Sheets

COPYING SYSTEM AND METHOD

BACKGROUND

The present disclosure broadly relates to the art of document reproduction and, more particularly, to a copying system capable of generating image data from an existing representation and communicating the image data to one or more associated marking systems for distributed output of sheet media bearing an image corresponding to the existing representation. The present disclosure also includes a method of generating such distributed output.

The terms "mark" and "marking," as used herein, are to be broadly interpreted to encompass any action or process involving the production or output of sheet media having text, images, graphics and/or other indicia formed thereon by any process, such as inkjet or electrophotographic processes, for example. Additionally, the term "marking system," as used herein, is to be broadly interpreted to encompass any device, apparatus or system that is capable of performing a "marking" action. Examples of such equipment and/or systems include, without limitation, desktop printers, network printers, stand-alone copiers, multi-function printer/copier/facsimile devices, high-speed printing/publishing systems and digital printing presses.

The terms "print" and "printing," as used herein, are to be interpreted as referring to any action or process involving the production or output of sheet media based upon data communicated from a device or system other than a marking system or component or sub-system thereof. Examples of such other devices or systems capable of communicating such data can include personal computers, workstations, network terminals, network servers and/or print servers, for example. The terms "printer" and "printing system," as used herein, are to be interpreted to encompass any device, system or apparatus that primarily performs "printing" actions. For the purposes of the subject application, "printers" and "printing systems," as used herein, represent a subset of "marking systems."

The terms "copy" and "copying," as used herein, are to be interpreted as referring to any action or process involving the production or output of sheet media based on image data that has been generated from and, thus, corresponds to an existing representation, such as an indicia on an existing document, for example. Additionally, the terms "copier" and "copying system," as used herein, are to be interpreted to encompass any device, apparatus or system that is capable of performing a "copying" action (i.e., generating image data from an existing representation and producing one or more sheets of media bearing an indicia corresponding to the existing representation using the image data). "Copiers" and "copying systems" represent another subset of "marking systems." It will be appreciated that, to some degree, the "printing system" and "copying system" subsets overlap, particularly in the area of multi-function printer/copier/facsimile devices. For purposes of the subject application, any device capable of scanning or otherwise acquiring image data based on an existing representation and generating sheet media output therefrom is considered a "copier" or "copying system," including, without limitation, such multi-function devices.

Additionally, such exemplary embodiments of equipment, systems and/or processes can utilize sheet media of any suitable type, kind, material, quality and/or thickness (e.g., recycled paper, plain paper, bond paper, coated paper, card stock, transparencies and/or other media). Furthermore, such exemplary embodiments of equipment, systems and/or processes can output indicia on such sheet media using any printing or marking substance, such as liquid ink, solid ink, toner and/or colorant, for example, in monochrome (e.g., black) or one or more colors, or any combination thereof.

Furthermore, the subject matter of the present disclosure is particularly well suited for use on and in association with systems capable of generating (e.g., scanning) image data corresponding to an existing representation (e.g., an indicia on an existing document) and outputting a reproduction thereof on sheet media, such as networked digital copiers and multi-function printer/copier/facsimile devices, for example, and will be discussed herein with particular reference thereto. It will be appreciated, however, that the subject matter of the present disclosure is capable of broad use in a wide variety of applications and environments. As such, it is to be distinctly understood that the showings and discussion herein are merely exemplary and are not intended to be limiting.

It is a well known and common arrangement for computer networks to be connected to or otherwise in communication with one or more marking systems (e.g., printing systems and multi-function devices) that are capable of generating printed output on sheet media. Such computer networks will normally include a plurality of computing devices (e.g., personal computers, workstations, network terminals) that are in communication with the one or more marking systems in a suitable manner, such as through one or more network servers, for example. Thus, the computing devices on such computer networks are capable of sending data corresponding to desired printed output (i.e., a print job) to the one or more marking systems for generation of the desired printed output.

One beneficial aspect of using networked marking systems is that the user can be provided with the capability of distributing any such printed output among two or more marking systems. One way that such distributed printing can be accomplished by simply having the user manually distribute the print job from a networked computing device to two or more of the marking systems that are available over the network. In this manner, the user can simply assign each of the two or more marking systems a predetermined number of printed documents to be output such that the required total number of printed documents are generated. The printed documents can then be collected from the two or more marking systems for later distribution and/or usage.

As an alternative, separate hardware and/or software solutions can be employed to more automatically distribute a print job to a group of two or more marking systems. For example, the computer network can include a print server in communication with the networked marking systems. Typically, a user submits the desired print job to the print server and the print server automatically attends to the generation or output of the printed documents by distributing the printing task among one or more of the networked marking systems. A print server can normally be configured to determine distribution based upon one or more factors, such as machine capability (e.g., color printing capability and finishing capabilities), machine capacity (e.g., pages per minute in simplex, pages per minute in duplex), and machine availability (e.g., current print job load), for example.

Additionally, or in the alternative, output management or other software can be used to control and optimize or otherwise balance marking system output. Such software solutions can be used in association with a print server of a computer network or can be used independently on the computer network to act as a virtual print server. In either case, such software is normally operative to distribute print jobs received from networked computing devices based on similar output optimization, load balancing and other such considerations.

In addition to the time and effort involved, one difficulty with employing the manual approach is that the user has to calculate the number of printed documents to be assigned to each marking system. Thus, errors can inadvertently occur in these calculations, which can undesirably result in too few or, alternately, too many printed documents being generated. What's more, a user is likely to be unable to take into account the various aspects of the network other marking systems to achieve an optimized or balanced distribution which would result in increased output rates and other productivity-related benefits. The alternative of utilizing print server and/or output management software solutions undesirably add additional cost and complexity to the network.

Furthermore, such solutions are typically only useful for distributing printjobs generated by computing devices connected through the computer network. That is, known distributed printing solutions do not operate to distribute copy jobs in the same manner. Rather, to achieve distributed copying, a user is left to make multiple trips to each copying system (i.e., to scan and then later retrieve). However, this approach can require considerable time and effort on the part of the user, and is still unlikely to result in an optimized or otherwise balanced utilization of resources.

As another alternative, a user could scan the existing representation, save the image data as an electronic file, access the electronic file using a suitably networked computing device, and send the copy job instead as a distributed print job. Thus, this approach, too, undesirably requires additional time and effort on the part of the user.

For at least the foregoing as well as for other reasons, it is desirable to develop a copying system capable of distributing output to other marking systems as well as a method of operating the same.

BRIEF DESCRIPTION

One embodiment of an electrophotographic copying system according to the present disclosure is provided that includes a scanning unit operative to generate image data corresponding to an associated scanned image and a sheet media source. A sheet media outlet is operatively spaced from the sheet media source. A media pathway is operatively connected to the sheet media source and the sheet media outlet. An electrophotographic marking unit is operatively disposed along the media pathway and is capable of generating marked sheets of media bearing an associated representation of the associated scanned image. A control system is in communication with at least the scanning unit and the marking - unit, and includes a network communication system capable of communicating with an associated marking system. Additionally, the control system is capable of receiving the image data from the scanning unit, generating marking data corresponding to the associated representation of the associated scanned image, and receiving user-inputted data requesting output of a set of two or more copies of the associated representation. The control system is also capable of generating first and second sub-sets of the set of two or more copies of the associated representation, communicating the marking data to the marking unit and the associated marking system, generating the first sub-set of copies using the electrographic marking unit, and requesting generation of the second sub-set of copies by the associated marking system.

One exemplary method of generating two or more copies of an associated image according to the present disclosure is provided that includes providing a first electrophotographic copying system (ECS) that includes a scanning system capable of generating image data corresponding to the associated image, a marking unit capable of generating marked sheets of media, and a control system in communication with at least the scanning system and the marking unit. The first ECS also includes a network interface in communication with an associated network. The method also includes providing a marking system that includes a marking unit capable of generating marked sheets of media and a network interface in communication with the associated network. The marking system being capable of receiving data from the first ECS through the associated network. The method further includes generating image data corresponding to the associated image using the scanning system of the first ECS and communicating the image data to the control system of the first ECS. The method also includes receiving user-inputted data corresponding to a total quantity of two or more copies of the associated image to be generated, and generating data corresponding to first and second quantities of copies of the associated image that together approximately equal the total quantity. The method further includes generating the first quantity of copies of the associated image using the marking unit of the first ECS. The method still further includes communicating the image data and the data corresponding to the second quantity of copies to the marking system for generation of the second quantity of copies of the associated image.

One exemplary method of distributing production of a set of copies of an associated document among a plurality of marking systems in accordance with the present disclosure is provided that includes providing a data communication network and providing a copying system. The copying system including a scanning system capable of generating document image data corresponding to the associated document, a marking unit capable of generating marked sheets of media, and a control system in communication with at least the scanning system and the marking unit. The control system also including a communication interface that is in communication with the data communication network and that is capable of at least sending data therethrough. The method also includes providing a plurality of marking systems that include a marking unit capable of generating marked sheets of media and a network interface that is in communication with the data communication network. Each marking system of the plurality of marking systems is capable of receiving data from the copying system through the data communication network. The method further includes generating document image data corresponding to the associated document using the scanning system of the copying system and communicating the document image data to the control system of the copying system. The method also includes receiving user-inputted data corresponding to a total quantity of copies in the set of copies of the associated document, and determining an availability of the plurality of marking systems and communicating the availability of the plurality of marking systems to a user. The method further includes receiving user-inputted data corresponding to a selection of one or more marking systems from the plurality of marking systems. The method also includes separating the set of copies into a plurality of sub-sets of copies each having a lesser quantity than the total quantity such that the plurality of sub-sets approximately equal the total quantity of the set of copies and generating sub-set data corresponding to the lesser quantities. The method further includes communicating the document image data and the sub-set data to the selection of one or more marking systems and requesting generation of the lesser quantity of copies thereby.

DETAILED DESCRIPTION

Figure 1:
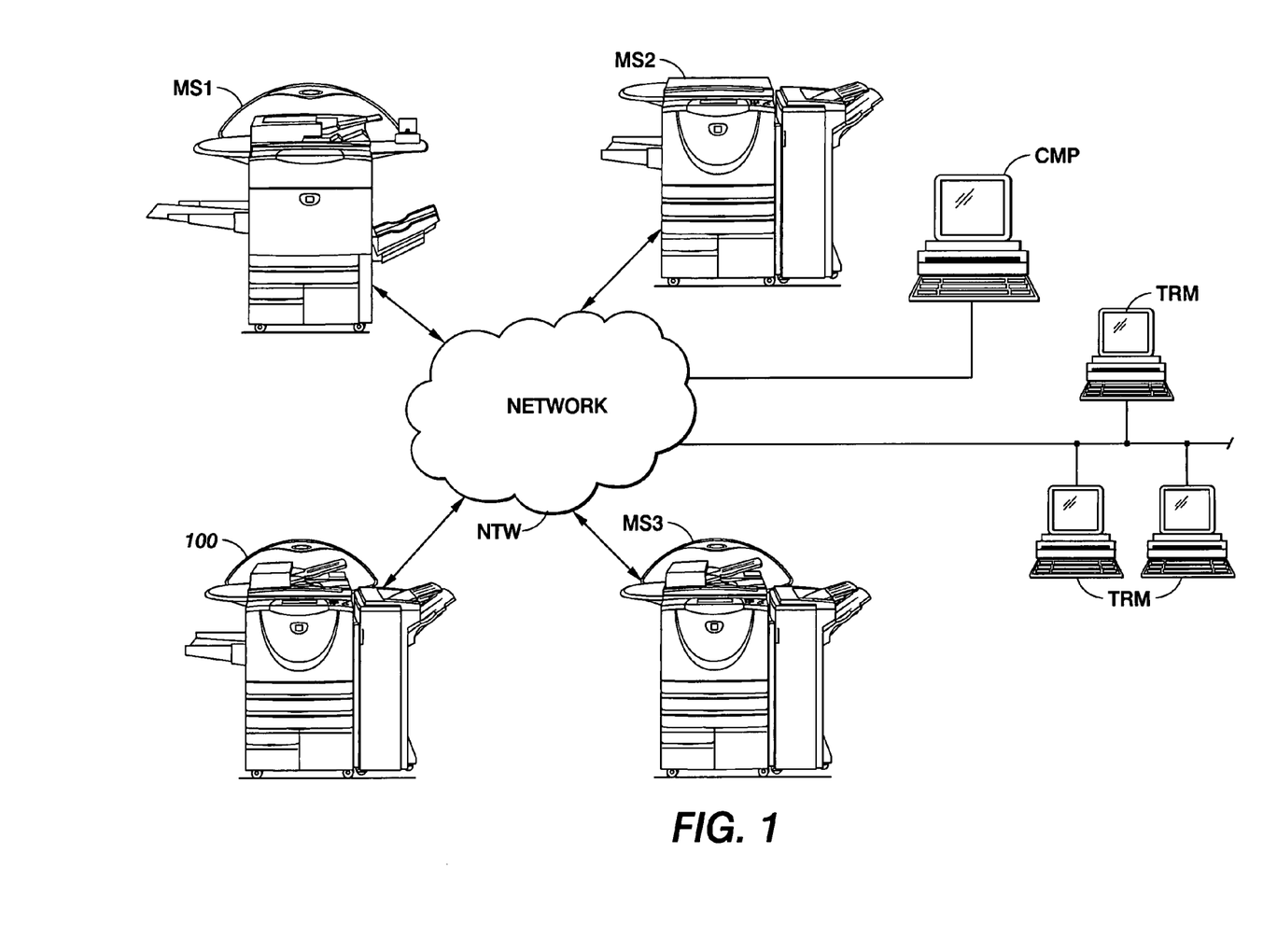
FIG. 1 is a schematic representation of one example of a copying system in accordance with the present disclosure in communication with other marking systems through a data communication network.
Figure 2:
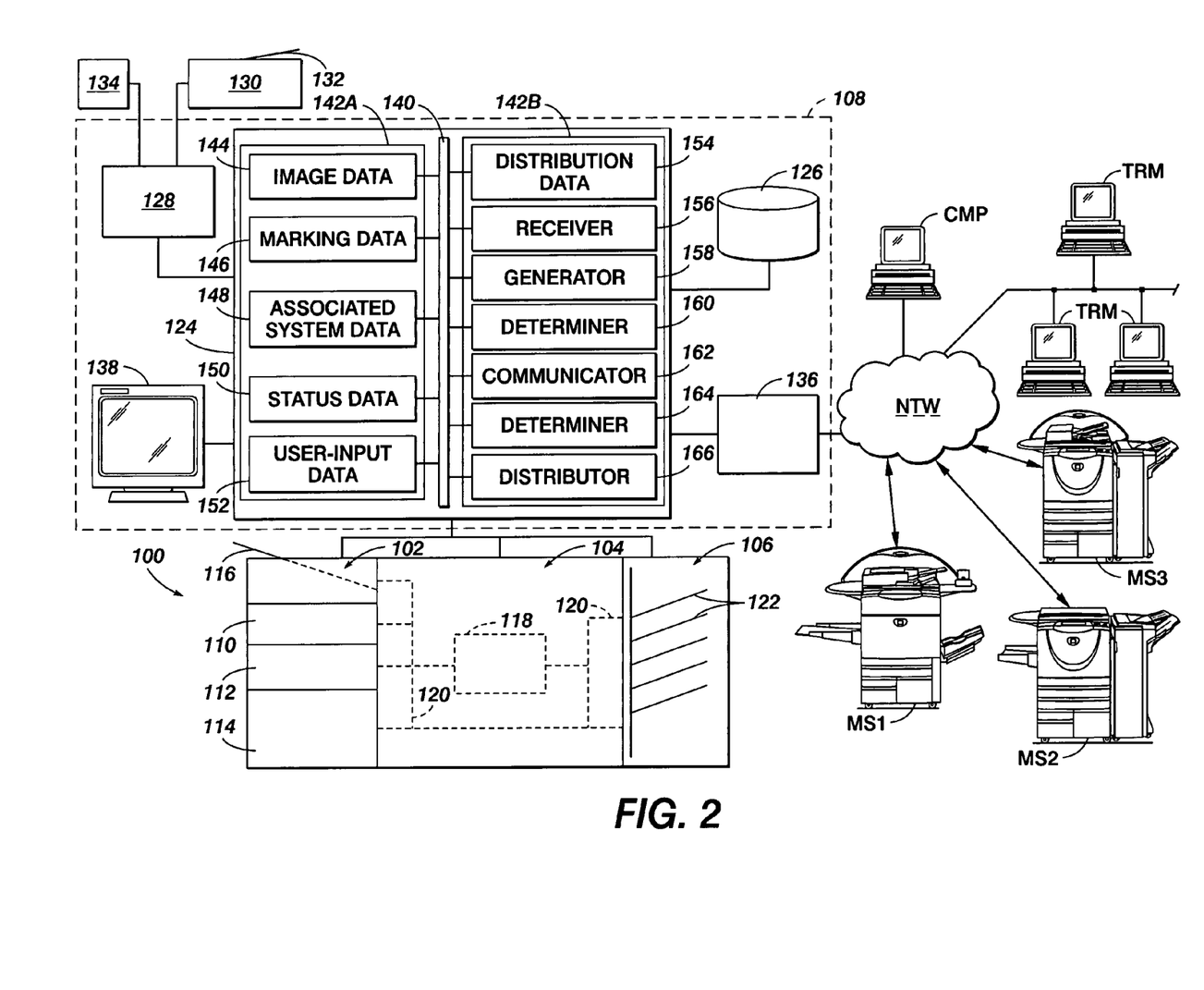
FIG. 2 is a schematic representation of the copying system in FIG. 1 shown in additional detail.

Turning now to the drawings wherein the showings are for the purpose of illustrating exemplary embodiments, and not for limiting the same, FIGS. 1 and 2 schematically illustrate a copying system 100 capable of communicating with one or more other marking systems in a suitable manner, such as through a data, computer or other communication network. In the exemplary arrangement shown, copying system 100, which can be considered the "host" machine, is in communication with a first marking system MS1, a second marking system MS2 and a third marking system MS3, which can be considered "target" machines, through a suitable network NTW. Copying system 100 is considered the host machine because a copy job received thereby will be distributed to target machines, such as marking systems MS1, MS2 and/or MS3, for generation of distributed copy output.

While it will be understood that any type, kind and/or configuration of associated marking system can be used, for purposes of illustration and discussion, the first, second and third marking systems will be considered to have the following specific features and configurations. First marking system MS1 is considered to be a monochrome multi-function print/copy/fax machine. Second marking system MS2 is considered to be a monochrome printing system without scanning or other image data generation capabilities. Second marking system MS2 is shown, however, as having finishing capabilities. Third marking system MS3 is considered to be a multi-function print/copy/fax machine that is capable of generating colored output and that also has finishing capabilities. Again, it will be understood that the foregoing descriptions are merely provided for purposes of discussion herein and that in practice marking systems MS1, MS2 and MS3 can be of any suitable type, kind and/or configuration. Additionally, it will be appreciated that even though a total of four marking systems are shown in FIGS. 1 and 2, any suitable number of marking systems could be used, such as from two marking systems to one hundred marking systems, for example.

Two or more computing devices can also be in communication with the marking systems. As shown in FIGS. 1 and 2, personal computer CMP and network terminals TRM are in communication with copying system 100 and marking systems MS1, MS2 and MS3 through network NTW. Thus, the marking systems can receive data communicated from one or more of the computing devices and generate printed output based on that data. In this manner, one or more of the marking systems can be capable of operation as a printing system or at least capable of performing printing functions.

Turning, more specifically, to FIG. 2, copying system 100 is shown in additional detail and includes a sheet media source 102, a marking system 104 in operative communication with the sheet media source, and a sheet media outlet 106 in operative communication with the marking system. Copying system 100 also includes a control system 108 in communication with one or more of the sheet media source, the marking system and/or the sheet media outlet for selective operation thereof. In the embodiment shown in FIG. 2, control system 108 is in communication with each of these systems. It is to be distinctly understood, however, that aspects of the present disclosure are applicable to a wide variety of types and kinds of copying systems, and that copying system 100 is merely exemplary of one suitable copying system.

Sheet media source 102 is shown in FIG. 2 as including multiple media supply trays 110, 112 and 114, which are suitable for storing bulk quantities of sheet media. Sheet media source 102 can also optionally include a bypass supply tray 116 that is capable of handling smaller quantities of sheet media. It will be appreciated that the supply trays are operative to introduce individual sheets of media to a suitable sheet feeding system or mechanism for dispensing the individual sheets. Additionally, it will be appreciated that media supply trays 110-116 are capable of receiving and supporting quantities of sheet media of any one of a variety of different sizes (e.g., letter, legal, A4) and/or orientations (e.g., short-edge first, long-edge first).

Marking system 104 can include one or more printing engines 118 in communication with media source 102 through a media transport pathway 120. It will be appreciated that the one or more printing engines can be of any suitable type or kind, and that such one or more printing engines will operate in accordance with known marking principles, such as ink jet marking or electrophotographic marking, for example.

Sheet media outlet 106 includes one or more output trays 122 and is in communication with the one or more printing engines of marking system 104 via media pathway 120. The sheet media outlet can be of any suitable type or kind, and can optionally be capable of performing one or more finishing operations of any type or kind. For example, sheet media outlet 106 could be operative to stack, collate, staple, hole punch, offset, bind, fold, insert separator sheets, and/or any combination of these or any other finishing operations.

As will be recognized by one of skill in the art, sheet media is fed from media source 102 to one or more printing engines 118 along media pathway 120. Once output by the printing engine or engines, the marked sheet media is delivered to the sheet media outlet and can simply be stacked, or one or more optional finishing operations can be performed.

In the exemplary embodiment shown in FIG. 2, control system 108 includes a controller 124 in communication with sheet media source 102, marking system 104 and sheet media outlet 106, each in a suitable manner. As one example, media source 102, marking system 104 and sheet media output 106 could be under direct supervision and control by controller 124. Alternately, control system 108 could optionally include one or more electronic control units (not shown) that are respectively associated with sheet media source 102, marking system 104 and sheet media outlet 106. Such one or more ECUs, if provided, could be in communication with controller 124 and at least partially supervise and/or control the respective components and/or systems with which the ECU or ECUs are associated.

Control system 108 can optionally include a data storage device 126, such as a non-volatile memory or hard drive, for example, suitable for storing image data, settings, attributes and any other data, values, text, graphics, information and/or content. The data storage device is shown in FIG. 2 as being in direct communication with controller 124, though it will be appreciated that any other suitable arrangement could alternately be used.

Additionally, control system 108 includes an input interface 128, which is shown in FIG. 2 as being in communication with controller 124. Input interface 128 can be used for or in association with generating, receiving, inputting or otherwise providing image data corresponding to an existing representation to the copying system. For example, input interface 128 can be in communication with a raster output scanning system 130 that is suitable for scanning sheet media and other existing representations, and transmitting rasterized images of the scanned documents or other representations to the controller or another system or component in the form of image data. Scanning system 130 can optionally include an automatic document feeding device 132 or other suitable arrangement for inputting sheet media. Input interface 128 can also be in communication with an optional memory device reader 134 adapted to retrieve document files, image files or other data or information from portable memory devices, such as memory cards, for example, and transmit such files, data or information to controller 124 or another system or component.

Additionally, control system 108 includes a communication interface 136, which is shown in FIG. 2 as being in communication with controller 124. Communication interface 136 is capable of communicating with associated computing devices (e.g., personal computer CMP and network terminals TRM) as well as other marking systems (e.g., marking systems MS1, MS2 and MS3) in a suitable manner, such as through communication network NTW, for example.

One or more user interface devices, such as a display, keyboard, pointing device, indicator lamp, associated computing device (e.g., a remotely connected or networked computer) or other input or output device, is provided on copying system 100 and is in communication with controller 124. In one preferred embodiment, a display 138 is provided that outputs graphical programming windows for communication of text, graphics, data, values and/or information to a user or operator. Additionally, the user interface is adapted for user input of text, graphics, data, values and/or information, such as from a keyboard (not shown), pointing device (not shown) or, in one preferred embodiment, touch-screen input on display 138, for example. It will be appreciated, however, that the foregoing user interface arrangement is merely exemplary and that text, graphics, data, values and/or information can be inputted and outputted in any suitable manner.

Control system 108 can also include any suitable hardware, software and/or combination thereof for configuration and operation of the copying system as well as for distribution of copied output among one or more other associated marking systems. For example, control system 108 can include a processing device, which can be of any suitable type, kind and/or configuration, such as a microprocessor, for example, for processing data, executing software routines/programs, and other functions relating to the performance and/or operation of copying system 100. Additionally, the control system can include a memory of any suitable type, kind and/or configuration that can be used to store software, parameters, settings, inputs, data, values and/or other information for use in association with the performance and/or operation of the copying system as well as distribution of output using the same. In the embodiment shown, controller 124 includes a microprocessor 140 and a memory 142, which is represented in FIG. 2 by boxes 142A and 142B. It will be appreciated, however, that the control system, including any controller, processing device and/or memory, can take any suitable form, configuration and/or arrangement.

Memory 142 can store or otherwise retain any suitable data, values, settings, software, algorithms, routines, programs and/or any other information, in any suitable manner or form. For example, memory 142A can store or otherwise include image data, values and/or information 144 that corresponds to an existing representation (e.g., a physical document bearing an indicia). Additionally, or in the alternative, such image data could, in whole or in part, be stored or otherwise retained in another suitable manner, such as on storage device 126, for example. It will be appreciated, however, that such image data, wherever and however stored, is, in one preferred embodiment, generated or otherwise obtained through the use of a suitable scanning system, such as scanning system 130, for example. Additionally, memory 142A can optionally store or otherwise retain marking data, values and/or information 146 corresponding to image data, such as may be stored in memory location 144, for example, and such marking data is, if provided, preferably suitable for communication to an associated marking system, such as one or more of marking systems MS1, MS2 and/or MS3, for example, for generation of distributed copy output. It will be appreciated, however, that such marking data could alternately be stored or otherwise retained, in whole or in part, in another suitable manner, such as on storage device 126, for example.

Memory 142A can also store or otherwise include associated system data, values and/or information 148, such as data, values and/or information having a relation to other associated marking systems that may be in or capable of being in communication with a copying system, such as copying system 100, for example, in any suitable manner, such as through network NTW, for example. Such associated system data, values and/or information can have a relation to any suitable features, characteristics or aspects of any one or more of the associated marking systems, such as physical location, operating features and capabilities (e.g., that second and third marking systems MS2 and MS3 have a given finishing capability) and performance characteristics (e.g., that first, second and third marking systems MS1, MS2 and MS3 respectively generate output at 65, 50 and 75 pages per minute), for example.

Additionally, memory 142A can store or otherwise include status data, values and/or information 150, such as may be related to the status of any suitable feature, characteristic or other aspect of an associated marking system. Such status data, values and/or information could, for example, include or otherwise correspond to a current, relatively recent or last known operating condition of a given feature of an associated marking system. Such status data, values and/or information could, as another example, include or otherwise correspond to a current usage or job load of an associated marking system. Furthermore, memory 142A can store or otherwise retain user-inputted data, values and/or information 152, such as may be used for distributing copied output to one or more associated marking systems from a host copying system, such as copying system 100, for example. Such data, values and/or information could include or have a relation to the total number of copies desired, the associated marking system(s) selected for distributed output, the number of copies assigned to a given marking system, or the selection of a routine capable of automatically distributing copied output to selected associated marking systems, for example. Memory 142A can also store or otherwise include distribution data, values and/or information 154, such as may be related to the selection and desired distribution of copied output among one or more additional associated marking systems. For example, such data, values and/or information could indicated that copying system 100 is to generate X1 number of copies, that first and third associated marking systems MS1 and MS3 are to generate X2 number of copies, and that second marking system MS2 is to generate X3 number of copies.

Memory 142B can optionally store or otherwise include an algorithm, routine or program 156 for receiving or otherwise acquiring image data corresponding to an existing representation, such as indicia on an existing document, for example. Such an algorithm, routine or program could, for example, receive rasterized images from scanning system 130 through input interface 128 and generate image data corresponding to the scanned representation. This image data could then be stored or otherwise retained, such as in memory store 144, for example. Memory 142B can also optionally store or otherwise include an algorithm, routine or program 158 for converting image data, such as may be stored in memory location 144, for example, into (or otherwise generating therefrom) marking data, such as may be stored in memory location 146, for example, which marking data is preferably suitable for use by the host copying system as well as the other associated marking systems in generating copied output. Any such marking data could also be stored or otherwise retained in a suitable memory or storage device, such as memory 146 or storage device 126, for example. Memory 142B can also optionally store or otherwise include an algorithm, routine or program 160 for determining a status or availability of one or more of the associated marking systems. For example, such a routine could query each of the associated marking systems and ascertain therefrom the status of various features, operating characteristics and performance aspects, and store or otherwise retain such data in a suitable manner, such as by storing the same in memory location 150, for example.

Memory 142B can also optionally store or otherwise include an algorithm, routine or program 162 for communicating status and/or availability data, values and/or information, such as may be retained in memory locations 148 and/or 150, for example, to a user or operator, such as by using display 138, for example. With such information available, any such user or operator may be able to distribute copied output in a more desirable and/or productive manner. Memory 142B can also store or otherwise include an algorithm, routine or program 164 for determining a distribution of copied output among the selected or otherwise available associated marking systems. Memory 142B also stores or otherwise includes an algorithm, routine or program 166 for communicating or otherwise distributing the copied output to the associated marking systems, such as from host copying system 100 to one or more of associated marking systems MS1, MS2 and MS3, for example.

It will be appreciated that the configuration and operation modules of control system 108, which are presented in this exemplary embodiment as algorithms, routines and/or programs 156-166, can be provided in any suitable manner, such as software, hardware and/or a combination of hardware and software, for example, and are not intended to be limited to the arrangement described above, which is merely exemplary. If provided in whole or in part as software, the configuration and operation modules of control system 108 can be provided and stored in any suitable manner or arrangement. For example, all of the algorithms, routines and/or programs could be integrated into a single software program in which separate sections or portions of the software code will perform the various actions and/or activities of the control system. In another embodiment, two or more independent modules (e.g., algorithms, routines and/or programs) could be used to perform the various actions and/or activities of the control system.

Microprocessor 140 is in communication with memory 142 and is operative to selectively access and/or process one or more of data, values, information, algorithms, routines and/or programs, such as those retained in memory stores 144-166, for example, alone or in combination. For example, microprocessor 140 can run or otherwise process an algorithm, routine or program, such as from memory location 156, for example, that is suitable for receiving or otherwise acquiring image data, such as can be stored thereby in memory location 144, for example. Microprocessor 140 can then, optionally, access memory store 158 to retrieve a routine for generating marking data based on the image data and storing the marking data, such as in memory location 146, for example. Microprocessor 140 could then access memory location 148 to retrieve pre-stored data corresponding to associated marking systems and access memory store 160 to retrieve a routine for determining a status or availability of one or more of the associated marking systems. After executing the routine from memory location 160, microprocessor 140 could store or otherwise retain, such as in memory location 150, for example, any data, values and/or information regarding a status of one or more features, characteristics and/or aspects of the associated marking systems.

Once the status of one or more of the associated marking systems has been ascertained, microprocessor 140 could access memory store 162 to retrieve a routine for communicating the data, values and/or information in memory locations 148 and/or 150 to a user or operator, such as by outputting any such data, values and/or information on display screen 138, for example. Additionally, the routine for communicating such data, values and/or information, can also be operable to permit microprocessor 140 to receive user-inputted data and store the same in a suitable manner, such as in memory location 152, for example. The microprocessor could then access memory store 164 to retrieve a routine for determining a distribution of copied output to the selected or otherwise available marking systems based on data, values and/or information from memory stores 150 and/or 152. The microprocessor could then generate distribution data therefrom and store or otherwise retain the same in a suitable manner, such as in memory location 154, for example.

Having determine a desired distribution for the copied output among the selected or otherwise available marking systems, microprocessor 140 could then access memory store 166 to retrieve a routine for communicating or otherwise actually distributing the copy jobs to associated marking systems. It is to be understood that the foregoing discussion of the operation of microprocessor 140 is merely exemplary and that any other suitable processes and/or operations could alternately be performed.

Figure 3:
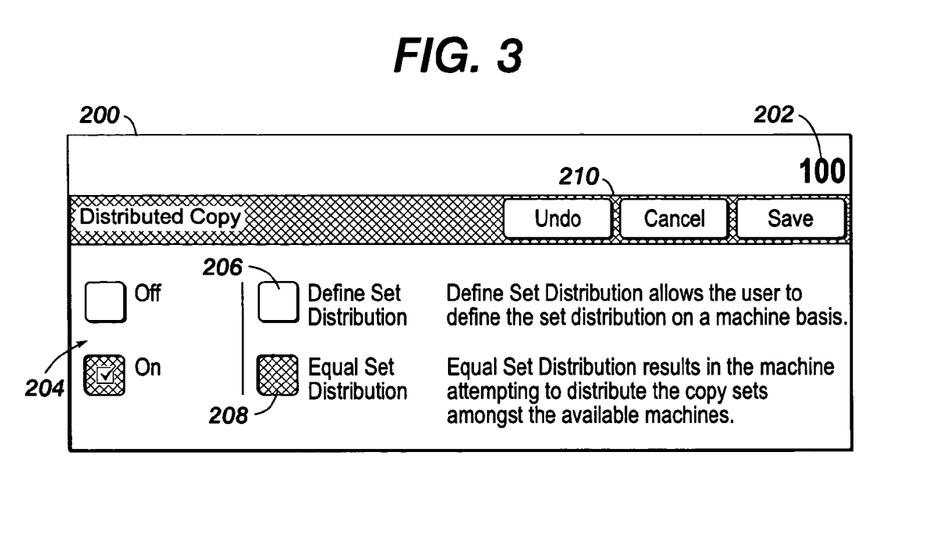
FIGS. 3-5 are representations of exemplary user interface screens for distributing copied output from a host copying machine to other associated marking systems.
Figure 4:
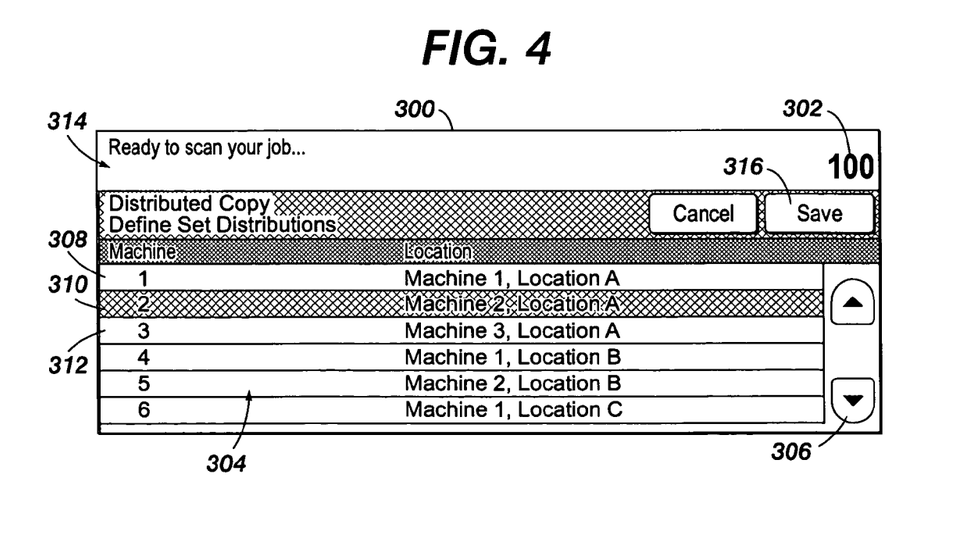
Figure 5:
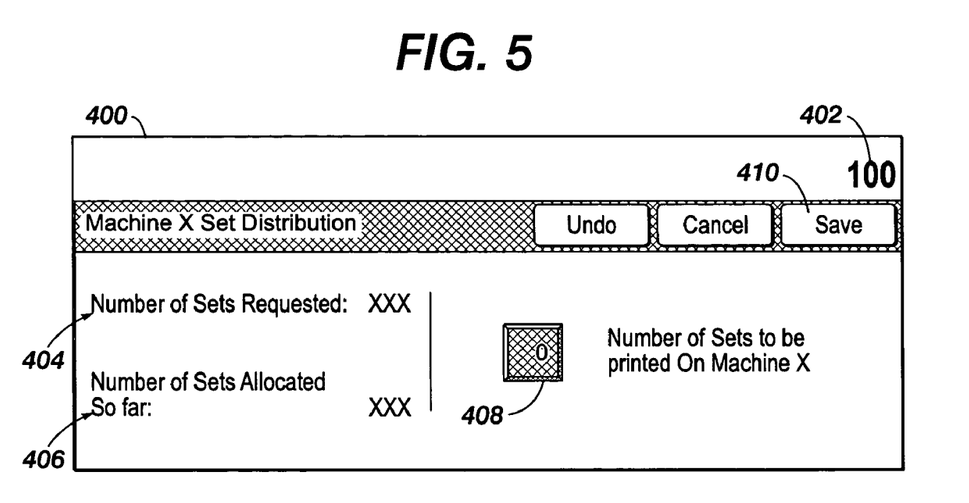

FIGS. 3-5 represent examples of graphical user interface screens or programming windows that could be used for user entry of data, values and/or information, such as may be related to the distribution of copied output, for example. However, it will be understood that any other suitable arrangement could alternately be used. Additionally, it will be appreciated that such graphical user interface programming windows can be displayed on a suitable display or monitor, such as display 138, for example. Furthermore, it will be appreciated that selection and movement through and/or between the foregoing and other graphical user interface screens can be performed in any suitable manner, such as by using a graphical selection device and an graphical programming interface, for example.

FIG. 3 represents an example of a graphical user interface screen 200 suitable user initiation of distributed output of copies from a host copying system (e.g., copying system 100). Screen 200 includes a numerical entry field 202 suitable for entry of a value corresponding to the overall number of output copies that are desired. Screen 200 also includes ON/OFF selector buttons 204 that are suitable for user initiation of a distributed copy function of the host copying system. Screen 200 further includes selector buttons 206 and 208 corresponding to different copied output distribution functions. Selector button 206 is associated with a user-defined distribution of copied output, whereas selector button 208 is associated with an automatically determined equal distribution of copied output. Additionally, screen 200 can optionally include operational buttons 210, such as for cancelling, saving or undoing earlier settings and/or actions. It will be appreciated that screen 200 is merely exemplary of one suitable graphical user interface screen and that any other arrangement could alternately be used. Also, it will be appreciated that provisions for the entry of any other suitable data, values and/or information could additionally, or alternately, be provided on screen 200. For example, information relating to the identity of the user and/or a department or location to receive the output could similarly be entered.

FIG. 4 represents an example of a graphical user interface screen 300 suitable for display and/or selection of associated marking systems to which copied output is to be distributed. Screen 300 illustrates, as indicated by item number 302, the total number of output copies that are desired, such as may have been entered in field 202 on a screen 200, for example. Screen 300 also includes a display field 304 listing the associated marking systems that are in communication with the host copying systems (e.g., copying system 100). A slider or arrow buttons 306 can optionally be provided to scroll through lengthy lists of associated marking systems. Numerous entries for associated marking systems are listed in display field 304 of screen 300. Entry 308 for Machine 1 could, for example, be considered to correspond to first associated marking system MS1, with entries 310 and 312 for Machines 2 and 3 being considered to correspond to second and third marking systems MS2 and MS3. As shown in field 304, entry 310 is shaded to indicate that the marking system associated with that entry is unavailable for distributed output of copies. It will be appreciated that such unavailability could be for any one of various reasons. For example, that machine could be temporarily out of service or the user could have pre-selected an output characteristic (e.g., a finishing operation or colored output) that is unavailable on that machine.

Screen 300 also includes a communication field 314 within which instructions to the user or operator can be provided. Additionally, screen 300 can optionally include operational buttons 316, such as for cancelling, saving or undoing earlier settings and/or actions. It will be appreciated that screen 300 is merely exemplary of one suitable graphical user interface screen and that any other arrangement could alternately be used. Also, it will be appreciated that provisions for the entry of any other suitable data, values and/or information could additionally, or alternately, be provided on screen 300.

FIG. 5 represents an example of a graphical user interface screen 400 suitable for assigning a number of output copies to be distributed to a given associated marking system, such as may have been selected from display field 304 of screen 300, for example. Screen 400 illustrates, as indicated by item number 402, the total number of output copies that are desired, such as may have been entered in field 202 on a screen 200, for example. This number is also reflected in display field 404, which indicates the overall number of sets or output copies that are to be generated. Screen 400 also includes a display field 406, which indicates the number of sets or output copies that have, to that point, been assigned to marking systems (i.e., the host copying system as well as any associated marking systems). Screen 400 also includes a numerical entry field 408 that is suitable for entry of a value corresponding to the number of sets or output copies that are to be assigned for distribution to the particular marking system that is selected. Additionally, screen 400 can optionally include operational buttons 410, such as for cancelling, saving or undoing earlier settings and/or actions. It will be appreciated that screen 400 is merely exemplary of one suitable graphical user interface screen and that any other arrangement could alternately be used. Also, it will be appreciated that provisions for the entry and/or modification of any other suitable data, values and/or information could additionally, or alternately, be provided on screen 400.

Figure 6:
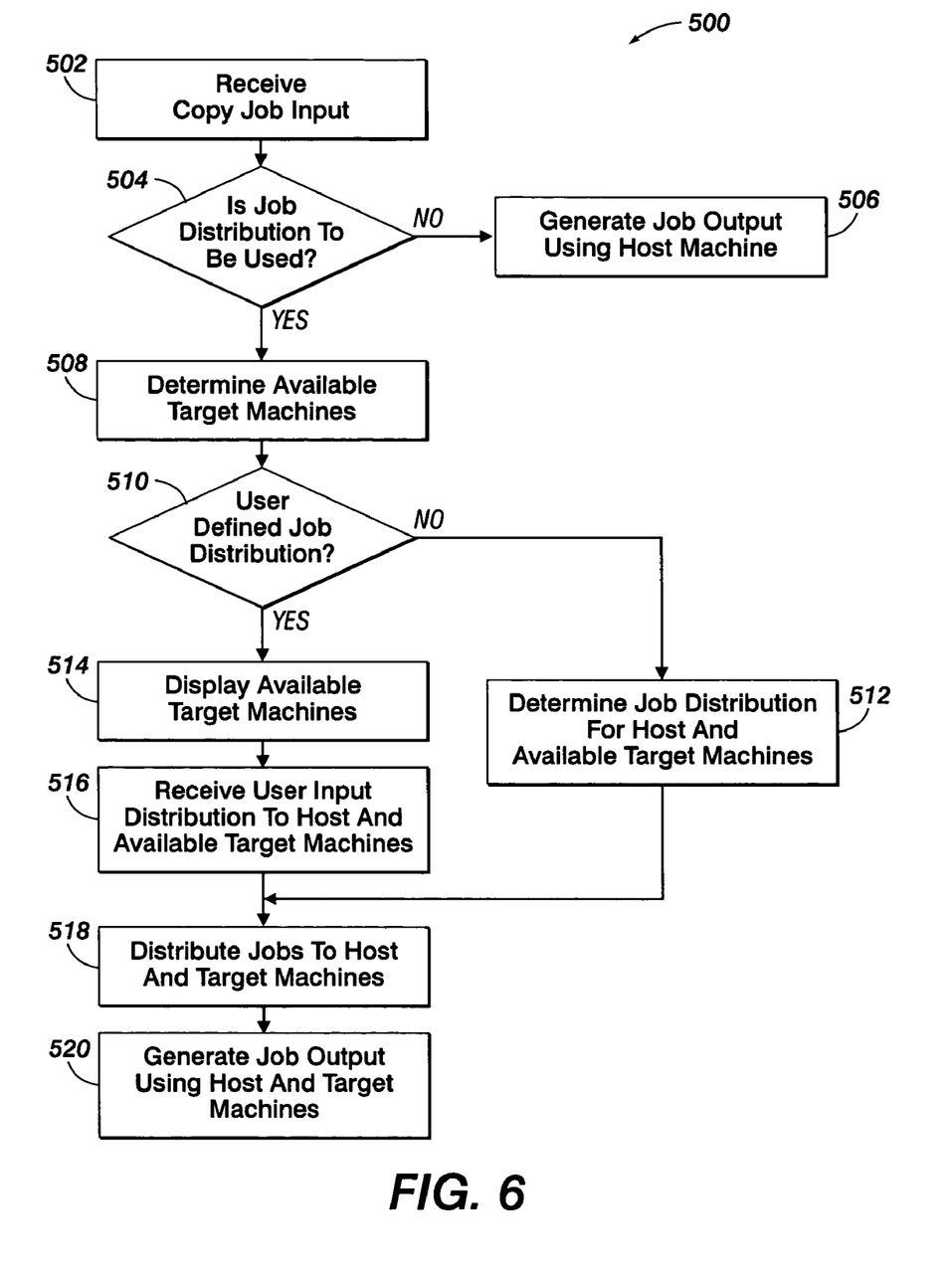
FIG. 6 is a flowchart of one exemplary method of distributing copied output from a host copying system to other associated marking systems.

One example of a method 500 of distributing copied output among a plurality of marking systems, such as copying system 100 and one or more of marking systems MS1, MS2 and MS3, for example, is shown in FIG. 6 and includes receiving inputted image data corresponding to an existing representation and initiating the generation of copied output (i.e., a copy job) corresponding to the existing representation based, at least in part, on the image data, as indicated by box 502. Once the generation of copied output has been initiated, method 500 reaches decision box 504 at which an inquiry is made as to whether the copy job is to be distributed to marking systems other than the host copying system (e.g., copying system 100). If a NO determination is made, the copied output is generated using the host machine. However, if a YES determination is made, method 500 proceeds with a determination of which target machines (e.g., marking systems MS1, MS2 and MS3) are available and/or capable of generating copied output, as indicated in box 508. Once the availability of any associated marking systems has been determined, method 500 reaches decision box 510 and inquires as to whether a user-defined distribution of copied output is to be used. If a NO determination is made, method 500 proceeds to automatically determine a suitable distribution of copied output, as indicated in box 512. It will be appreciated that such an automatic determination of distribution can be performed in any suitable manner and according to any suitable formulas, values and/or metrics. For example, the desired quantity of copied output could simply be evenly distributed to all of the selected or otherwise available marking systems. Alternately, a distribution based on capacity (i.e., pages per minute of output), availability, proximity or any combination of these or other factors could be used.

If a YES determination is made in decision box 510, method 500 proceeds display the available target machines (i.e., the associated marking systems) to the user or operator, as indicated in box 514. Method 500 then includes receiving user-inputted data, values and/or information regarding the selection and distribution of copied output to the available target machines, as indicated in box 516. Thus, the user is able to define in any suitable manner the distribution of copied output to any one or more of the available target machines.

Regardless of whether the distribution of copied output is automatically generated, as in box 512, or inputted by a user, as in box 516, method 500 then proceeds to distribute or otherwise communicate the data, values and information associated with the distributed copy job to the selected target marking systems, as indicated in box 518. Method 500 then includes box 520, which indicates that the copied output is generated using the host and target marking systems. It will be appreciated, however, that once each distributed copy job is communicated from the host machine (e.g., copying system 100) to the target machine (e.g., marking systems MS1, MS2 and MS3), control of and responsibility for completion of each individual distributed copy job is transferred to the specific target machine that received that copy job.

Figure 7:
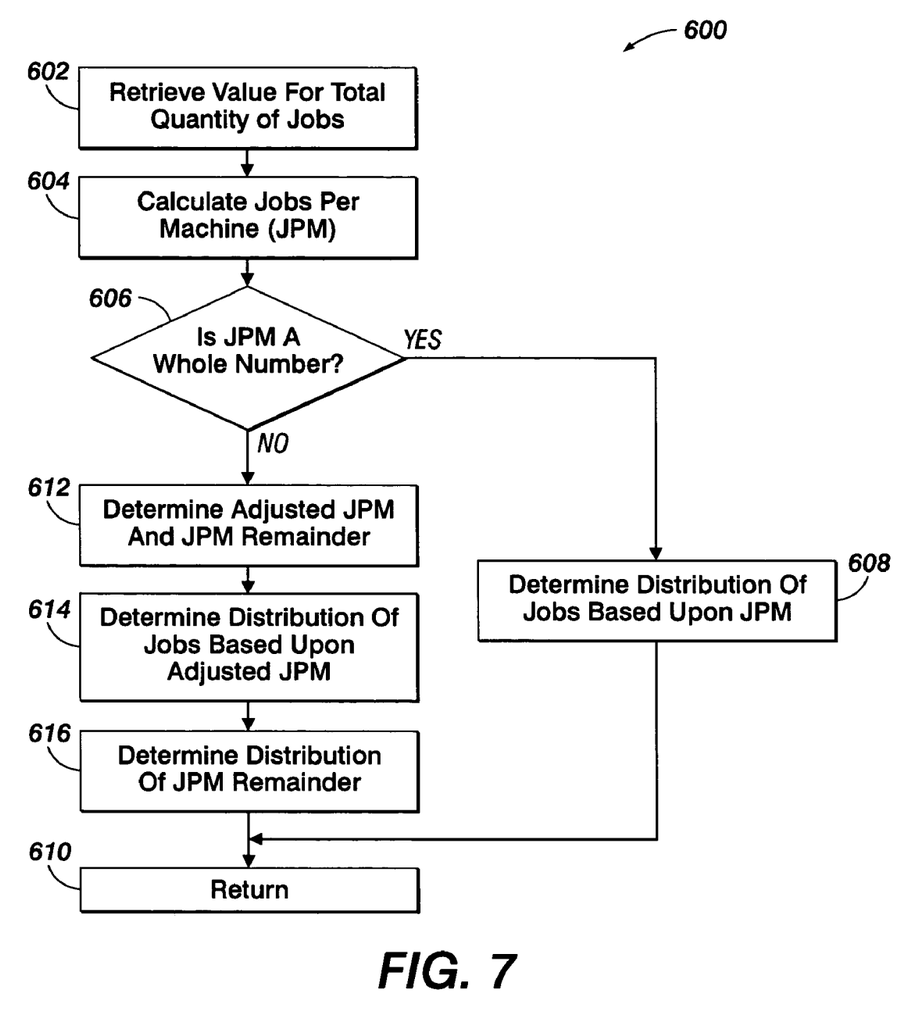
FIG. 7 is a flowchart of one exemplary method of determining a distribution of copied output.

As discussed above with regard to boxes 510-514 of method 500, distribution of copied output can be automatically determined by the host machine or can be manually established by a user or operator. One example of a method 600 of automatically determining a distribution is shown in FIG. 7 and, as indicated in box 602, includes retrieving any pertinent data, values and/or information, such as may be stored in memory locations 150 and/or 152 of copying systems 100, for example. Such data, values and/or information can include the number of selected or otherwise available marking systems among which copied output is to be distributed and the total number of copies or reproductions (also referred to hereinafter as "jobs") that are desired by the user. Method 600 then proceeds to calculate or otherwise determine the number of copies (or jobs) per machine (JPM) base on the retrieved data, values and/or information, as indicated in box 604. Method 600 then reaches decision box 606 at which a determination is made as to whether the number of jobs per machine is an whole number. If a YES determination is made, method 600 proceeds determine or otherwise assign distribution of copied output based on the calculated jobs per machine, as indicated in box 608. Having completed the determination, method 600 can store any data, values and/or information and return to another algorithm, routine or program.

If, however, a NO determination is reached at decision box 606, method 600 proceeds to determine an adjusted jobs per machine value that is a whole number, as indicated in box 612. Method 600 then proceeds to determine or otherwise assign distribution of copied output based on the adjusted jobs per machine value, as indicated in box 614. Method 600 can then proceed to distribute the difference or remainder between the total copy jobs that will be generated using the adjusted jobs per machine value, which may be lower than the calculated jobs per machine value, and the total number of outputted copies that are desired, as indicated in box 616. Having determined and distributed the remainder of copy jobs to one or more of the marking systems, method 600 can end or otherwise return to another algorithm, routine or program, as indicated in box 610.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. An electrophotographic copying system comprising:
    a scanning unit operative to generate image data corresponding to an associated scanned image;
    a sheet media source;
    a sheet media outlet operatively spaced from said sheet media source;
    a media pathway operatively connecting said sheet media source and said sheet media outlet;
    an electrophotographic marking unit operatively disposed along said media pathway and capable of generating marked sheets of media bearing an associated representation of the associated scanned image; and,
    a control system in communication with at least said scanning unit and said marking unit and including a network communication system capable of communicating with an associated marking system, said control system capable of:
        receiving said image data from said scanning unit;
        generating marking data corresponding to the associated representation of the associated scanned image;
        receiving user-inputted data requesting output of a set of two or more copies of the associated representation;
        generating first and second sub-sets of said set of two or more copies of the associated representation;
        communicating said marking data to said marking unit and the associated marking system;
        generating said first sub-set of copies using said electrographic marking unit; and,
        requesting generation of said second sub-set of copies by the associated marking system.

2. An electrophotographic copying system according to claim 1, wherein the associated marking system is one of a plurality of associated marking systems and said control system is capable of communicating with the plurality of associated marking systems through said network communication system.

3. An electrophotographic copying system according to claim 2, wherein said control system includes a determiner capable of determining an availability of one or more of the plurality of associated marking systems.

4. An electrophotographic copying system according to claim 3, wherein said set of two or more copies comprises a plurality of copies, said first and second sub-sets of said set of a plurality of copies are said first and second sub-sets of a plurality of sub-sets, and said control system includes a determiner capable of determining a distribution value of copies per available associated marking system and capable of generating said plurality of sub-sets of copies using said distribution value.

5. An electrophotographic copying system according to claim 4, wherein said control system include a communicator capable of communicating a sub-set of said plurality of sub-sets to said available associated marking systems for generation of said sub-set of copies thereby.

6. An electrophotographic copying system according to claim 3, wherein said control system includes a user interface capable of communicating said availability of said one or more of the plurality of associated marking systems to a user.

7. An electrophotographic copying system according to claim 6, wherein said user interface is capable of receiving user-inputted selections of said one or more of the plurality of associated marking systems, and said control system includes a receiver capable of receiving data corresponding to said user-inputted selections.

8. An electrophotographic copying system according to claim 7, wherein said set of two or more copies comprises a plurality of copies, said first and second sub-sets of said set of a plurality of copies are said first and second sub-sets of a plurality of sub-sets, and said control system includes a determiner capable of determining a distribution value of copies per selected associated marking system and capable of generating said plurality of sub-sets of copies using said distribution value.

9. An electrophotographic copying system according to claim 8, wherein said control system include a communicator capable of communicating a sub-set of said plurality of sub-sets to said selected associated marking systems for generation of said sub-set of copies thereby.

10. A method of generating two or more copies of an associated image, said method comprising:
   a) providing a first electrophotographic copying system (ECS) that includes a scanning system capable of generating image data corresponding to the associated image, a marking unit capable of generating marked sheets of media, and a control system in communication with at least said scanning system and said marking unit and including a network interface in communication with an associated network;
   b) providing a marking system that includes a marking unit capable of generating marked sheets of media and a network interface in communication with the associated network, said marking system capable of receiving data from said first ECS through the associated network;
   c) generating image data corresponding to the associated image using said scanning system of said first ECS and communicating said image data to said control system of said first ECS;
   d) receiving user-inputted data corresponding to a total quantity of two or more copies of the associated image to be generated;
   e) generating data corresponding to first and second quantities of copies of the associated image that together approximately equal said total quantity;
   f) generating said first quantity of copies of the associated image using said marking unit of said first ECS; and,
   g) communicating said image data and said data corresponding to said second quantity of copies to said marking system for generation of said second quantity of copies of the associated image.

11. A method according to claim 10, wherein a) includes providing a control system that includes a generator capable of generating marking data having a relation to said image data, and wherein communicating said image data in g) includes communicating said marking data to said marking system.

12. A method according to claim 10, wherein a) includes providing a control system that includes a user interface, an input receiver capable of receiving user-inputted data from said user interface and a memory, and wherein d) includes receiving said user-inputted data at said input receiver from said user interface and storing said user-inputted data in said memory.

13. A method according to claim 12, wherein a) includes providing a control system that includes a first determiner capable of determining a status of said marking system and storing data corresponding to said status in said memory, and wherein e) includes generating said data corresponding to said second quantity of copies based at least in part on said status of said marking system.

14. A method according to claim 13, wherein said first determiner is capable of determining a performance capability of said marking system and storing said performance capability in said memory, and e) includes generating said data corresponding to said second quantity of copies based at least in part on said performance capability of said marking system.

15. A method according to claim 14, wherein a) includes providing a control system that includes a second determiner capable of generating said data corresponding to said second quantity of copies based at least in part on said status and said performance capability of said marking system.

16. A method of distributing production of a set of copies of an associated document among a plurality of marking systems, said method comprising:
   a) providing a data communication network;
   b) providing a copying system that ,includes a scanning system capable of generating document image data corresponding to the associated document, a marking unit capable of generating marked sheets of media, and a control system in communication with at least said scanning system and said marking unit and including a communication interface that is in communication with said data communication network and capable of at least sending data therethrough;
   c) providing a plurality of marking systems that include a marking unit capable of generating marked sheets of media and a network interface that is in communication with said data communication network, each marking system of said plurality of marking systems being capable of receiving data from said copying system through said data communication network;
   d) generating document image data corresponding to the associated document using said scanning system of said copying system and communicating said document image data to said control system of said copying system;
   e) receiving user-inputted data corresponding to a total quantity of copies in said set of copies of the associated document;
   f) determining an availability of said plurality of marking systems and communicating said availability of said plurality of marking systems to a user;
   g) receiving user-inputted data corresponding to a selection of one or more marking systems from said plurality of marking systems;
   h) separating said set of copies into a plurality of sub-sets of copies each having a lesser quantity than said total quantity such that said plurality of sub-sets approximately equal said total quantity of said set of copies and generating sub-set data corresponding to said lesser quantities;
   i) communicating said document image data and said sub-set data to said selection of one or more marking systems and requesting. generation of said lesser quantity of copies thereby.

17. A method according to claim 16 further comprising generating marking data corresponding to said document image data, and communicating said document image data in i) includes communicating said marking data to said selection of one or more marking systems.

18. A method according to claim 16, wherein said control system of said copying system provided in b) includes a graphical user interface and communicating said availability in f) includes communicating with a user using said user interface.

19. A method according to claim 18, wherein receiving said user-inputted data in e) includes receiving a numeric quantity through said graphical user interface.

20. A method according to claim 18, wherein receiving said user-inputted data in g) includes receiving a graphical selection of said one or more marking systems through said graphical user interface.

21. A method according to claim 16, wherein i) includes communicating said document image data and said sub-set data to said selection of one or more marking systems based at least in part on said determined availability of said selection of one or more marking systems.

* * * * *